US012689269B2

(12) United States Patent
Straßer

(10) Patent No.: US 12,689,269 B2
(45) Date of Patent: Jul. 21, 2026

(54) METHOD FOR ADDING OR REMOVING A ROTOR HAVING AT LEAST ONE PERMANENT MAGNET OF A PERMANENTLY EXCITED SYNCHRONOUS MACHINE IN A MOTOR VEHICLE, AND MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 317 days.

(21) Appl. No.: 18/239,653

(22) Filed: Aug. 29, 2023

(65) Prior Publication Data

US 2024/0072620 A1 Feb. 29, 2024

(30) Foreign Application Priority Data

Aug. 30, 2022 (DE) .......................... 102022121844.9

(51) Int. Cl.
| | |
|---|---|
| *H02K 15/03* | (2025.01) |
| *H02K 1/27* | (2022.01) |
| *H02K 11/33* | (2016.01) |

(52) U.S. Cl.
CPC ............... *H02K 15/03* (2013.01); *H02K 1/27* (2013.01); *H02K 11/33* (2016.01)

(58) Field of Classification Search
CPC .......... H02K 1/27; H02K 11/33; H02K 15/03; H02K 15/16; H02K 15/40; H02K 15/50; H01P 6/00; H01P 6/16; Y10T 29/49009; Y10T 29/53143; Y10T 29/53274
See application file for complete search history.

(56) References Cited

U.S. PATENT DOCUMENTS

| | | | | | |
|---|---|---|---|---|---|
| 6,484,389 | B1 | 11/2002 | Levin et al. | | |
| 2011/0162199 | A1* | 7/2011 | Johnson | ................. | H02K 15/16 |
| | | | | | 335/284 |
| 2012/0133230 | A1* | 5/2012 | Jansen | ................... | H02K 15/03 |
| | | | | | 29/596 |

FOREIGN PATENT DOCUMENTS

| | | | | | |
|---|---|---|---|---|---|
| CN | 202121403 | U | 1/2012 | | |
| CN | 112202294 | A * | 1/2021 | ............. | H02K 15/50 |
| CN | 113098216 | A | 7/2021 | | |
| DE | 1941558 | A1 | 8/1970 | | |
| DE | 19546689 | A1 | 6/1997 | | |

(Continued)

OTHER PUBLICATIONS

CN-112202294-A translation from FIT database (Year: 2026).*
DE-19546689-A1 translation from FIT database (Year: 2026).*

*Primary Examiner* — Thomas J Hong
*Assistant Examiner* — Joshua D Anderson
(74) *Attorney, Agent, or Firm* — Seed Intellectual Property Law Group LLP

(57) ABSTRACT

A method for adding or removing a rotor having at least one permanent magnet of a permanently excited synchronous machine in a motor vehicle, which also includes a stator having one or more stator windings, wherein the permanently excited synchronous machine and a pulse inverter connected to the one or more stator windings form a motor arrangement, wherein upon adding or removing the rotor the stator windings are energized for generating a stator field acting against the permanent magnetic field generated by the permanent magnet of the rotor by the pulse inverter in a maintenance mode, such that the forces occurring between the stator and the rotor are reduced and/or at least partly canceled.

13 Claims, 2 Drawing Sheets

(56) References Cited

FOREIGN PATENT DOCUMENTS

| DE | 102009050991 | A1 | 5/2011 |
|----|--------------|----|--------|
| EP | 2246961 | A1 | 11/2010 |
| JP | 2003315145 | A | 11/2003 |
| JP | 2008259356 | A | 10/2008 |
| JP | 2010220400 | A | 9/2010 |

* cited by examiner

METHOD FOR ADDING OR REMOVING A ROTOR HAVING AT LEAST ONE PERMANENT MAGNET OF A PERMANENTLY EXCITED SYNCHRONOUS MACHINE IN A MOTOR VEHICLE, AND MOTOR VEHICLE

BACKGROUND

Technical Field

The present disclosure relates to a method for adding or removing a rotor having at least one permanent magnet of a permanently excited synchronous machine in a motor vehicle, which also includes a stator having one or more stator windings, wherein the permanently excited synchronous machine and a pulse inverter connected to the stator windings form a motor arrangement. The disclosure also relates to a motor vehicle.

Description of the Related Art

In motor vehicles with an electric traction machine, such as hybrid motor vehicles or electric motor vehicles, permanently excited synchronous machines (PSM) are also used. Thus far, in event of a fault in the permanently excited synchronous machine, it was required to replace the entire electrical axle, and thus the entire synchronous machine. Moreover, it was known in any case how to replace an associated pulse inverter (PWR) separately in a repair shop, depending on the installation or mounting situation.

With the increasing number of electric motor vehicles operating on the road, the demand for a greater level of repairs in the shop is also increasing, especially for cost and sustainability reasons. However, the replacement of the rotor in a normal motor vehicle repair shop cannot be done at present, due to the immense forces of the permanent magnet. Although in the production process the introduction of the rotor, which is usually designed as an internal rotor, in the corresponding opening of the stator is made possible by high-performance multi-axis robots, such a concept cannot simply be translated to repair shops, for which such a multi-axis robot seems to be too complicated, too costly, and not profitable. Hence, at present there is no known repair concept for motor vehicles in repair shops at which a rotor can be taken out and installed. Yet this would be desirable, for example, when only the rotor is faulty or when the rotor needs to be temporarily removed for the repair of a bearing.

The document EP 2 246 961 A1 proposes a permanently excited electric machine in which a variable magnetization of the rotor should be provided. For this, it is proposed to provide a first permanent magnet in the rotor, the product of the coercive force times the thickness in the direction of magnetization of which is small, and a second permanent magnet, the product of the coercive force times the thickness in the direction of magnetization of which is large. This makes it possible to accomplish, for the first permanent magnet, a change in the magnetization by an armature coil and thus also a change in the magnetization of the entire rotor. In this special configuration, it is also proposed to magnetize the first permanent magnet such that the fluxes of the first and the second permanent magnet are directed opposite each other, so that the magnetic force of attraction between the rotor and the stator is reduced and a dismantling becomes possible.

The document CN 202 121 403 U relates to a motor cover structure for a permanent magnet motor, wherein the motor cover structure comprises an inner hole, the diameter of which is chosen such that it only just exceeds the outer diameter of the rotor. An improved stability is afforded due to the opening of adapted size, since the supporting force of the motor cover structure is greater than the magnetic force between the stator and the rotor.

The document CN 113 098 216 A proposes, for a better mating of the external rotor and the stator for wind turbine machines, the placing of a magnetically conductive tool in the air gap on the rotor between neighboring magnets, which weakens the magnetic force between the rotor and the stator and thus significantly reduces the risk of abutment or collision of the rotor and the stator. In this way, the difficulty of the mating process is also significantly reduced.

BRIEF SUMMARY

Embodiments of the present disclosure are based on improving the maintainability and repairability of permanently excited synchronous machines in motor vehicles, such as in regard to sustainability and/or the costs.

Some embodiments provide a method that when adding or removing the rotor, the stator windings are energized by the pulse inverter in a maintenance mode for generating a stator field acting against the permanent magnetic field generated by the permanent magnet of the rotor, such that the forces occurring between the stator and the rotor are reduced and/or at least partly canceled.

Hence, an operating mode is provided for the pulse inverter, namely, the maintenance mode, in which the stator windings are operated such that a stator magnetic field is produced, acting against the permanent magnetic field and thus the forces between the rotor and the stator, which considerably simplifies the removal or adding of the rotor, being designed in particular as an internal rotor. Thus, even for simple auto repair shops there already exists a ready solution on the part of the motor vehicle for replacing only rotors of permanently excited synchronous machines or removing them temporarily for other repairs. Thus, if the rotor needs to be replaced or taken out for a repair of the rotor, this can be accomplished in the maintenance mode through an electromagnetic stator field of the stator windings.

The main problem preventing a removal (or replacement) of the rotor thus far is the large magnetic forces which occur, such as in regard to the stator lamination stacks of the stator. In the maintenance mode, a stator field is established which acts against the magnetic forces between the rotor and the stator and neutralizes them as much as possible. The maintenance mode and the special construction of the stator field are done through the pulse inverter. For example, the information for the maintenance mode may be kept in a storage medium of a control device controlling the pulse inverter, such as a controller. It is preferable when the maintenance mode may only be called up on the part of the repair shop or other service providers, such as by a third device, and thus one not available to the user or driver of the motor vehicle. Such special operating modes, for example production operating modes or transport operating modes, have already been proposed for motor vehicles in the prior art, so that the maintenance mode constitutes a similar, special configuration, which is only meaningful for maintenance or repair work and therefore is provided ideally only to appropriate technical personnel.

On the whole, the maintenance mode allows an increased repair extent in a simple, inexpensive way, and thus a savings of costs as compared to the replacement of the entire permanently excited synchronous machine or even the entire axle. The procedure is sustainable, since a repair is possible instead of a replacement. Moreover, there are time savings since a repair can be done directly in a repair shop.

The stator field can be generated advisedly in dependence on a rotor position information. The rotor position, by which is meant here the rotary position, determines the radial distribution of the permanent magnetic field to which the stator field should be attuned. Hence, by making use of rotor position information describing the rotary position of the rotor, the stator field can be generated precisely. There are various ways of accomplishing this.

Thus, in the first place, it can be provided that the rotor position information, such as when removing the rotor, is determined by a rotor position sensor of the synchronous machine. This also allows, in particular, an individual adaptation to different rotary positions of the rotor, as regards to the stator field. If the rotor position sensor is adapted to providing the rotor position information even when the rotor is not positioned in or around the stator, one can also proceed accordingly when adding the rotor, of course. In addition or alternatively, it may be provided that the rotor position information, such as when adding the rotor, indicates a given standard position of the rotor. This means that a standard position, i.e., a standard rotary position, of the rotor can be defined, at which the stator field is attuned and generated in the maintenance mode. This has the benefit that there is no dependency on sensors and the stator field only needs to be determined and generated for one particular rotary position, hence, the given standard position, so that in particular only one set of control information is necessary for the maintenance mode. Moreover, a rotary position of the rotor can be chosen specifically as the standard position, for which the stator field acting against the permanent magnetic field can be generated with high accuracy and effectiveness.

In general, it is useful when a rotor tool used for the adding and/or removing holds the rotor fixed in rotation. In this way, an adapting of the stator field in regard to the position of the rotor pole is not necessary during the slow process of adding or removing the rotor. For example, the tool may be a fixation crane. In particular, in regard to a given standard position of the rotor, it may be provided that a coupling of the rotor tool to the rotor occurs or is only possible in one or in the given standard position. This means that the rotor tool or the rotor can already "code" the given standard position, for example, so that the given standard position can be utilized without much expense and the stator field can be coordinated with it in the maintenance mode, for example.

In one embodiment, the power supply of the pulse inverter in the maintenance mode may come via a high-voltage network of the motor vehicle. This means that no complicated connection of an additional, external, special and costly energy source is necessary, since the motor vehicle can continue to provide the necessary electric energy. The high-voltage network at the motor vehicle side can be furnished by a high-voltage battery, such as a traction battery, as is known, and this usually has a higher DC voltage as the operating voltage than a low-voltage network provided in the motor vehicle, such as a 12V onboard network.

Even when the synchronous machine or the entire motor arrangement is removed from the motor vehicle, the power supply can still come from the high-voltage network of the motor vehicle if cable extensions are attached to connect the pulse inverter to the stator windings or the high-voltage network to the pulse inverter.

Similarly, a communication device of the motor vehicle may also be used to activate the maintenance mode, and if the pulse inverter is also being removed, such as during the removal of the entire motor arrangement, once again a cable extension can be used to attach the pulse inverter, such as a control device of the pulse inverter, to the communication device of the motor vehicle, such as a vehicle bus. In this way, no replacement is required for the communication device, such as costly residual bus simulations.

In one modification of the present disclosure, it can be provided that the maintenance mode is activated through a diagnostic device, such as a tester, which is external to the motor vehicle and hooked up to a diagnostic port of the motor vehicle. Such testers are basically known in the prior art for repair shops, and they allow diagnostic activities, such as testing activities, with respect to various components hooked up by a special or general vehicle bus. If the pulse inverter or the control device, such as a controller, is connected to the diagnostic port, it is therefore easily possible to send a corresponding command to activate the maintenance mode by the corresponding communication device, such as the vehicle bus. Some embodiments are possible in which the maintenance mode may be activated only through the diagnostic device, such as the tester, in order to avoid as much as possible a faulty or unwanted activation and to restrict this to a use by technical personnel, when advisable.

For better protection of the rotor and the stator, one embodiment calls for introducing a protective cylinder, such as one made of plastic, into the air gap or the region intended for the air gap prior to adding or removing the rotor. In the operating state, an air gap is usually provided between the rotor and the stator. This may have, for example, a radial extension in the range of 1 mm. Now, a thin cylinder, for example one made of plastic, can be shoved into the air gap (or the corresponding region provided when the rotor has not yet been added), so that no damage can occur to the stator or rotor when they are added or removed. The protective cylinder is removed once more, at the latest, after the adding of the rotor has been completed.

It has been found that, even without considering the present axial position of the rotor relative to the stator, the present disclosure enables an adding or removal of the rotor in a repair shop in a low-cost manner. The forces easily mustered in a repair shop are sufficient for this. However, a further improvement can also be achieved if the stator field is adapted in the axial direction by actuating the pulse inverter in dependence on a present axial position of the rotor. This means that consideration can be given to whether the rotor is only partly overlapping with the stator. Specifically, the axial position may be determined by a measurement instrument, such as optically and/or by measuring the magnetic field of the rotor at a fixed stator position.

In general, it can be further noted that corresponding stator fields can be determined, for example, by computations and/or simulations, such as also making use of optimization techniques, and the corresponding actuation parameters for the maintenance mode, such as certain rotor positions and/or axial positions or rotor position regions or axial position regions, associated with the maintenance mode, can be saved in a storage medium, such as one on the part of the controller actuating the pulse inverter.

Besides the method, some embodiments also relate to a motor vehicle, comprising a motor arrangement having a permanently excited synchronous machine, which comprises a rotor having at least one permanent magnet and a stator having at least one stator winding, such as three stator windings, and having a pulse inverter connected to the stator windings and a controller for actuating the pulse inverter. The motor vehicle is characterized in that the controller is adapted to operate the pulse inverter in a maintenance mode, in which the stator windings are energized for generating a stator field acting against the permanent magnetic field generated by the permanent magnet of the rotor such that the forces occurring between the stator and the rotor are reduced and/or at least partly canceled. All the remarks concerning the method according to the present disclosure can be applied analogously to the motor vehicle according to the present disclosure, with which therefore the benefits already mentioned can likewise be obtained.

The motor vehicle is an electric motor vehicle in which the permanently excited synchronous machine serves as a traction machine in a drive train.

BRIEF DESCRIPTION OF THE SEVERAL
VIEWS OF THE DRAWINGS

Further benefits and details will emerge from the embodiments described in the following, as well as the drawings.

DETAILED DESCRIPTION

Figure 1:
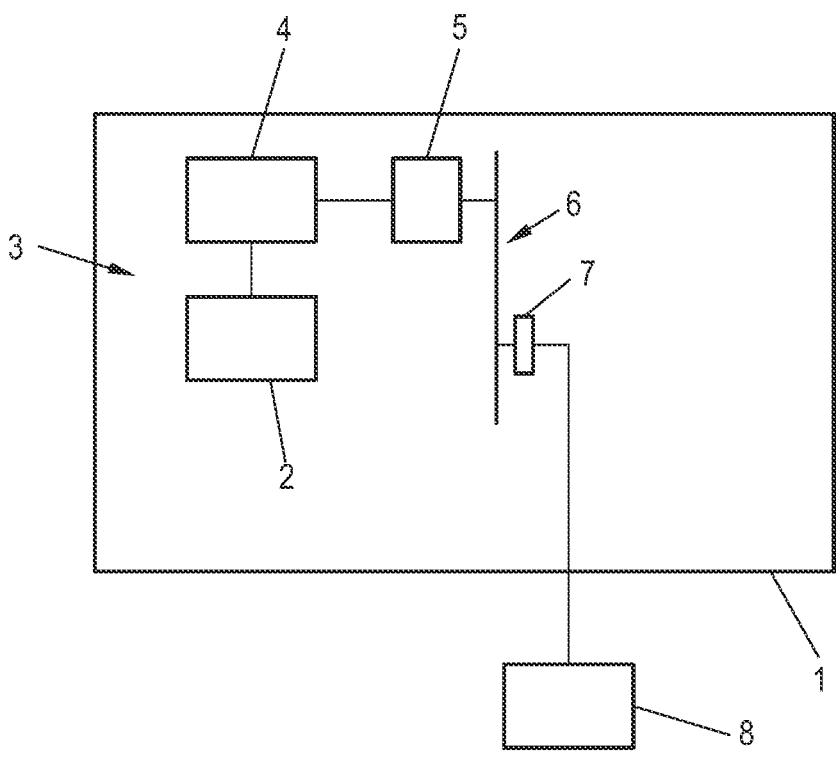
FIG. 1 shows a schematic diagram of a motor vehicle.

FIG. 1 shows a schematic diagram of a motor vehicle 1, in the present instance being an electric motor vehicle. The electric motor vehicle 1 comprises, as a traction machine in a not otherwise indicated drive train, a permanently excited synchronous machine 2, which is part of a motor arrangement 3 with a pulse inverter 4. The pulse inverter 4 is connected to the stator windings of the permanently excited synchronous machine 2. The operation of the pulse inverter 4 is controlled by a controller 5, in which a maintenance mode also resides. In the maintenance mode, the stator windings are energized by the pulse inverter 4 such that the permanent magnet of the rotor works against a permanent magnetic field resulting in an attraction between the rotor and the stator.

The controller 5 is connected by a vehicle bus 6, among others, to a diagnostic interface 7 of the motor vehicle 1, by which a diagnostic device 8, such as a tester, also shown here schematically, can be hooked up.

Figure 2:
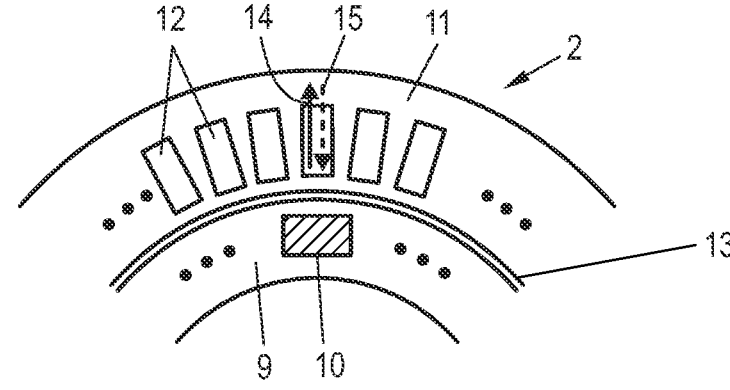
FIG. 2 shows a portion of a schematic cross section through a permanently excited synchronous machine.

FIG. 2 shows a schematic partial cross section through the permanently excited synchronous machine 2. This comprises the internal rotor 9 with the permanent magnet 10 as well as the external stator 11 with stator windings 12 for the different phases. The rotor 9 and the stator 11 are separated by an air gap 13, as is basically known.

In a normal operating state, when the stator windings 12 are not energized, strong magnetic forces of attraction are produced between the rotor 9 and the stator 11, such as on account of the corresponding stator lamination stacks (not shown here). The permanent magnetic field 14 of the permanent magnet 10, only roughly indicated here, is responsible for this. This prevents the removal of the rotor 9 from the stator 11 or the adding of the rotor 9 in the stator 11 without the use of costly, high-performance technology, such as a special robot. Even so, in order to make this possible, for example in a repair shop, the maintenance mode is provided, which can be selected by the diagnostic device 8 through the diagnostic interface 7 and the vehicle bus 6 in the controller 5. The controller 5 then actuates the pulse inverter 4 to energize the stator windings 12 such that a stator field 15 is produced, indicated schematically in FIG. 2, which acts against the permanent magnetic field 14 and thus reduces the strong forces between the stator 9 and the rotor 11. It is then possible, even in a simple auto repair shop, to move the rotor 9 relative to the stator 11 and to remove it, for example for purposes of a replacement or to carry out a repair. The rotor 9 or a replacement rotor may also be added back in.

Figures 3, 4:
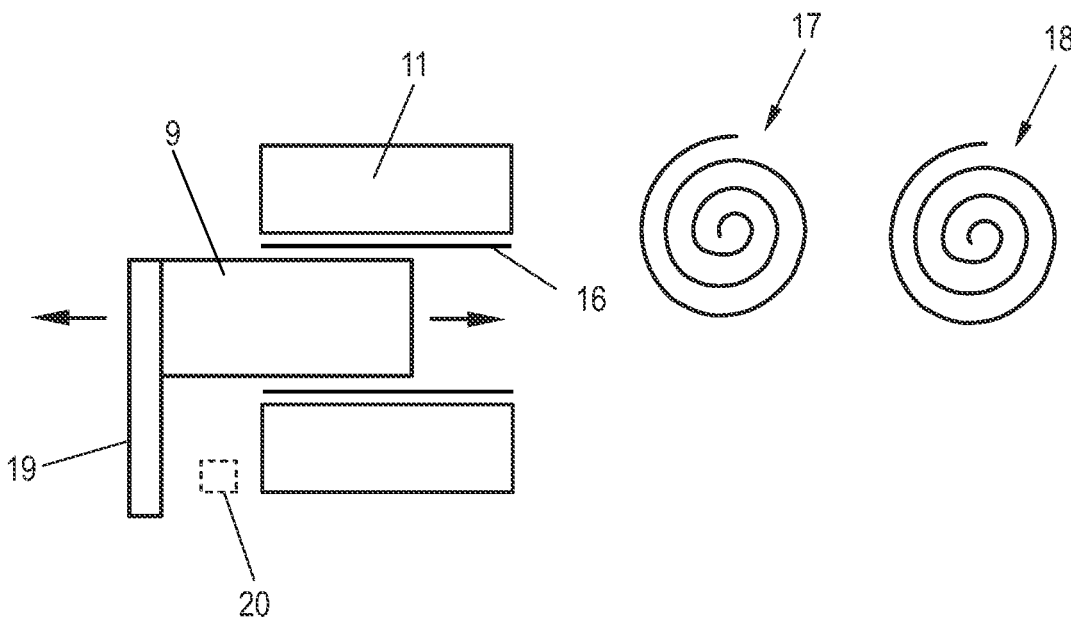
FIG. 3 shows a schematic diagram for the adding or removal of a rotor.
FIG. 4 shows a flow chart of an embodiment of a method described herein.

This is explained more fully by the diagram in FIG. 3. This shows that, at first, before any step to remove or add the rotor 9, a thin, nonmagnetic protective cylinder 16, for example one made of plastic, is shoved into the air gap 13. This prevents any damage to the rotor 9 or the stator 11 during the movement of the rotor 9 relative to the stator 11. Insofar as the synchronous machine 2 at least, possibly also the entire motor arrangement 3, needs to be taken out for maintenance or repair from the motor vehicle 1, a cable extension 17 is provided for lengthening the necessary power supply cable, since the required electric energy should be provided also in the maintenance mode from a high-voltage network of the motor vehicle 1, not otherwise shown here, to which the motor arrangement 3 is hooked up. If the controller 5 is also being removed, a corresponding cable extension 18 can also be used to maintain the communication with the vehicle bus 6.

In the present embodiment, it is assumed that the rotor 9 is being added or removed in a given standard position, i.e., rotary position. This makes it possible to keep a fixed set of actuation parameters in the controller 5, such as a corresponding storage medium, in order to generate a stator field 15 which is attuned, or optimized, to this given standard position by appropriate actuation of the pulse inverter 4 and appropriate energization of the stator windings 12. It is also conceivable to adapt the actuation and thus the stator field 15 to different rotary positions of the rotor 9, for example based on the rotor position information of a rotor position sensor (not shown).

According to FIG. 3, the rotor 9 can be moved by a rotor tool 19, only suggested here, which holds the rotor 9 in its present rotary position and may be configured in some embodiments such that a fastening to the rotor 9 is only possible in the given standard position; a corresponding contrivance may also be provided in addition or alternatively on the part of the rotor 9. The rotor tool can be, for example, a fixation crane or the like.

It should further be noted here that it has been discovered in the context of the present disclosure that effects due to inhomogeneities resulting in partly inserted axial positions of the rotor 9 are of lesser importance and do not jeopardize the removal or adding of the rotor 9 too much. Even so, some embodiments are also conceivable in which the actuation of the pulse inverter 4 and thus the energization of the stator windings 12 and thus the stator field 15 can also be adapted to different axial positions of the rotor 9 or different axial position ranges, for which a measurement device 20 only suggested here can be used, such as an optical measurement device.

In summary, FIG. 4 shows a flow chart of an embodiment of the method described herein. After the synchronous machine 2 or the motor arrangement 3 with the controller 5 has been removed from the motor vehicle 1, in a step S1 the cable extensions 17 and optionally 18 are used to maintain the electric power connection and optionally the communication connection. Moreover, in step S1 the protective cylinder 16 is shoved into the air gap 13.

In a step S2, the maintenance mode is activated by the diagnostic device 8, so that in a step S3 the adding or removal of the rotor 9 can be done, such as by the rotor tool 19. In a step S4, the maintenance mode can then be terminated once more and the protective cylinder 16 removed or the cable extension 17, 18 dismantled.

German patent application no. 10 2022 121844.9, filed Aug. 30, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for adding or removing a rotor having at least one permanent magnet of a permanently excited synchronous machine in a motor vehicle, the method comprising:

connecting a pulse inverter of the vehicle to one or more stator windings of a stator of the permanently excited synchronous machine to form a motor arrangement of the vehicle; and adding or removing the rotor having the at least one permanent magnet into the stator of the permanently excited synchronous machine while energizing the stator winding by the pulse inverter in a maintenance mode for generating a stator field acting against a permanent magnetic field generated by the at least one permanent magnet of the rotor, such that attraction forces occurring between the stator and the rotor are reduced and/or at least partly canceled.

2. The method according to claim 1, wherein the stator field is generated in dependence on rotor position information when adding or removing the rotor.

3. The method according to claim 2, wherein the rotor position information when removing the rotor is determined by a rotor position sensor of the synchronous machine.

4. The method according to claim 3, wherein when adding the rotor, the rotor is positioned such that the rotor position information indicates a given standard position of the rotor.

5. The method according to claim 2, wherein a rotor tool used for the adding or removing the rotor holds the rotor fixed in rotation and/or allows a coupling to the rotor only in one position or in the given standard position.

6. The method according to claim 1, wherein a power supply of the pulse inverter in the maintenance mode comes via a high-voltage network of the motor vehicle.

7. The method according to claim 6, wherein when the permanently excited synchronous machine and/or the motor arrangement is removed, cable extensions are attached to connect the pulse inverter to the stator windings or the high-voltage network to the pulse inverter.

8. The method according to claim 1, wherein the maintenance mode is activated through a diagnostic device which is external to the motor vehicle and hooked up to a diagnostic port of the motor vehicle.

9. The method according to claim 1, wherein prior to adding or removing the rotor, a protective cylinder is introduced into an air gap between the rotor and the stator or a region intended for the air gap.

10. The method according to claim 9, wherein the protective cylinder is made of plastic.

11. The method according to claim 1, wherein the stator field is adapted in an axial direction by actuating the pulse inverter in dependence on a present axial position of the rotor.

12. The method according to claim 11, wherein the axial position is determined by a measurement device.

13. The method according to claim 12, wherein the axial position of the rotor is determined by the measurement device optically and/or by measuring the magnetic field of the rotor at a fixed stator position.

* * * * *